(12) United States Patent
Martin

(10) Patent No.: US 9,371,926 B2
(45) Date of Patent: Jun. 21, 2016

(54) PRESSURE RELIEF VALVE WITH SINGULAR BODY

(71) Applicant: AUSCO, INC., Farmingdale, NY (US)

(72) Inventor: Francis J. Martin, Huntington, NY (US)

(73) Assignee: AUSCO, INC., Farmingdale, NY (US)

( * ) Notice: Subject to any disclaimer, the term of this patent is extended or adjusted under 35 U.S.C. 154(b) by 0 days.

(21) Appl. No.: 14/872,684

(22) Filed: Oct. 1, 2015

(65) Prior Publication Data

US 2016/0025233 A1 Jan. 28, 2016

Related U.S. Application Data

(60) Division of application No. 14/063,760, filed on Oct. 25, 2013, now Pat. No. 9,200,717, which is a continuation-in-part of application No. 12/017,265, filed on Jan. 21, 2008, now abandoned.

(51) Int. Cl.
| | |
|---|---|
| *F16K 15/06* | (2006.01) |
| *F16K 17/04* | (2006.01) |
| *F16K 17/196* | (2006.01) |
| *F16K 17/10* | (2006.01) |
| *F16K 27/02* | (2006.01) |

(52) U.S. Cl.
CPC .............. *F16K 17/04* (2013.01); *F16K 15/063* (2013.01); *F16K 17/10* (2013.01); *F16K 17/196* (2013.01); *F16K 27/0209* (2013.01); *Y10T 137/0497* (2015.04); *Y10T 137/7758* (2015.04); *Y10T 137/7854* (2015.04); *Y10T 137/7939* (2015.04)

(58) Field of Classification Search
CPC ... F16K 15/021; F16K 15/026; F16K 15/063; F16K 17/04; F16K 17/10; F16K 17/196; F16K 27/0209; Y10T 137/0497; Y10T 137/7758; Y10T 137/7854; Y10T 137/7856; Y10T 137/6086; Y10T 137/7929–137/7939
USPC .......... 137/15.19, 515.5, 315.33, 540–543.23
See application file for complete search history.

(56) References Cited

U.S. PATENT DOCUMENTS

| | | | | |
|---|---|---|---|---|
| 1,367,815 | A | * 2/1921 | Henemier | ............... F16K 15/20 137/234.5 |
| 2,377,938 | A | 6/1945 | Hoffman | |
| 2,568,026 | A | * 9/1951 | Pigott | ................. F16K 17/0433 137/469 |
| 2,645,242 | A | 7/1953 | Monnich | |
| 2,699,179 | A | * 1/1955 | Hansen | ................ G05D 7/0133 137/539 |
| 2,745,432 | A | * 5/1956 | Williams | .............. F16K 15/063 137/540 |
| 2,822,817 | A | 2/1958 | Benzel | |
| 2,858,838 | A | * 11/1958 | Scaramucci | ............ E21B 21/10 137/15.26 |

(Continued)

*Primary Examiner* — William McCalister
(74) *Attorney, Agent, or Firm* — F. Chau & Associates, LLC

(57) ABSTRACT

A pressure relief valve includes a singular body that encloses a seat and a stationary shim, a poppet, within the singular body, that is forced against a seat by a spring attached to the stationary shim, and a pin inserted into the pressure relief valve body to lock the pressure relief valve into a housing bore. The poppet includes a nose extension that extends into a void enclosed by the seat to provide damping. The seat includes a non-threaded stepped region on its outer surface and the singular body includes a complementary stepped region on its inner surface such that when the seat is fit into the singular body, the stepped region of the seat and the complementary stepped region of the singular body interface with each other to prevent movement of the seat toward the spring. The pin includes a coating to reduce friction and galling.

6 Claims, 3 Drawing Sheets

(56) References Cited

U.S. PATENT DOCUMENTS

| | | | | |
|---|---|---|---|---|
| 2,931,385 A | | 4/1960 | Carlisle et al. | |
| 2,958,549 A | * | 11/1960 | Spafford | F16L 33/08 24/274 R |
| 3,255,774 A | * | 6/1966 | Gallagher | F16K 17/06 137/516.29 |
| 3,478,934 A | * | 11/1969 | Lindquist | A47K 5/1204 222/309 |
| 3,565,100 A | * | 2/1971 | Pfleger | F16K 15/026 137/269.5 |
| 3,568,708 A | * | 3/1971 | Ashman | F16K 15/20 137/234.5 |
| 3,662,761 A | * | 5/1972 | Hoffman | F16K 41/08 137/543.19 |
| 3,670,766 A | * | 6/1972 | Tyson | F16K 1/38 137/515.5 |
| 3,711,131 A | * | 1/1973 | Evans | F16L 33/2073 285/256 |
| 3,746,038 A | * | 7/1973 | Simmons | F02C 7/228 137/513.5 |
| 3,754,568 A | | 8/1973 | Gallagher et al. | |
| 3,801,234 A | * | 4/1974 | Love | F04B 53/00 137/515.5 |
| 3,911,950 A | * | 10/1975 | Lowe | F16K 17/0466 137/543.17 |
| 3,921,662 A | * | 11/1975 | Hauffe | F16K 17/285 137/515 |
| 4,140,148 A | * | 2/1979 | Richter | B65D 51/1644 137/240 |
| 4,146,275 A | * | 3/1979 | Elliott | B60T 15/36 137/494 |
| 4,171,119 A | * | 10/1979 | Lamson | B60C 29/02 137/223 |
| 4,202,369 A | * | 5/1980 | Viravec | F16K 17/04 137/469 |
| 4,205,417 A | * | 6/1980 | Mackal | A61M 25/1018 24/115 M |
| 4,315,523 A | * | 2/1982 | Mahawili | G01F 3/20 137/486 |
| 4,428,396 A | | 1/1984 | Wall | |
| 4,471,802 A | | 9/1984 | Pryor | |
| 4,566,486 A | * | 1/1986 | Taylor | F16K 17/0406 137/469 |
| 4,635,973 A | * | 1/1987 | Sauer | F16L 33/22 285/242 |
| 4,703,914 A | | 11/1987 | Hoffmann | |
| 4,706,705 A | | 11/1987 | Lee, II | |
| 4,776,369 A | * | 10/1988 | Lardner | F16L 33/225 137/515 |
| 4,953,589 A | | 9/1990 | Nakamura | |
| 4,953,622 A | | 9/1990 | Lehr et al. | |
| 5,056,756 A | | 10/1991 | Norkey et al. | |
| 5,072,862 A | * | 12/1991 | Keller | B01F 5/0615 222/327 |
| 5,141,012 A | * | 8/1992 | Gavrila | F16K 43/005 137/15.18 |
| 5,159,953 A | * | 11/1992 | Sato | B60K 15/04 137/454.2 |
| 5,174,327 A | * | 12/1992 | Truax | A62C 35/68 137/469 |
| 5,195,788 A | * | 3/1993 | Oetiker | B21D 39/046 285/252 |
| 5,209,527 A | * | 5/1993 | Hohmann | F16L 33/20 285/242 |
| 5,215,118 A | * | 6/1993 | Scaramucci | F16K 15/03 137/515.5 |
| 5,241,986 A | * | 9/1993 | Yie | B05B 1/306 137/512 |
| 5,277,402 A | | 1/1994 | Szabo | |
| 5,297,777 A | * | 3/1994 | Yie | B05B 1/3046 251/214 |
| 5,299,598 A | * | 4/1994 | Quartana, III | F16K 1/38 137/516.29 |
| 5,349,984 A | | 9/1994 | Weinheimer et al. | |
| 5,382,142 A | * | 1/1995 | Spears | E21B 43/127 137/515 |
| 5,462,341 A | * | 10/1995 | Koyano | B60T 8/1831 137/493.9 |
| 5,609,300 A | * | 3/1997 | Conatser | B05B 1/3006 239/332 |
| 5,799,493 A | | 9/1998 | Morris et al. | |
| 5,901,743 A | | 5/1999 | Schulz | |
| 5,988,705 A | * | 11/1999 | Norkey | F16L 37/0987 137/614.05 |
| 6,113,572 A | * | 9/2000 | Gailey | A61M 39/12 285/12 |
| 6,179,589 B1 | * | 1/2001 | Bass | F04C 23/008 137/543.19 |
| 6,299,132 B1 | * | 10/2001 | Weinheimer | A61M 39/26 251/149.1 |
| 6,354,564 B1 | * | 3/2002 | Van Scyoc | F16L 37/32 137/614.04 |
| 6,382,243 B2 | * | 5/2002 | Hiddessen | G05D 16/10 137/505.18 |
| 6,474,359 B1 | | 11/2002 | Smith, III | |
| 6,513,545 B2 | * | 2/2003 | Rhone | F16K 17/30 137/460 |
| 6,622,752 B2 | * | 9/2003 | Kushida | F16K 17/0406 137/536 |
| 6,631,734 B2 | * | 10/2003 | Smith, III | E21B 33/0375 137/538 |
| 6,905,318 B2 | | 6/2005 | Kouno et al. | |
| 6,910,494 B2 | | 6/2005 | Warsakis | |
| 6,971,390 B1 | * | 12/2005 | Vasek | A61M 25/0097 285/245 |
| 7,163,531 B2 | * | 1/2007 | Seese | A61M 39/10 604/246 |
| 7,222,637 B2 | * | 5/2007 | Miyajima | F16K 15/026 137/513.3 |
| 7,306,197 B2 | * | 12/2007 | Parrino | A61M 39/26 251/149.6 |
| 7,387,624 B2 | * | 6/2008 | Nelson | A61M 5/14276 604/533 |
| 7,464,723 B2 | * | 12/2008 | Klein | F16K 17/06 137/524 |
| 2005/0167981 A1 | * | 8/2005 | Nuttall | F16L 37/0848 285/316 |
| 2005/0242579 A1 | * | 11/2005 | Bright | A61M 5/14276 285/256 |
| 2006/0266421 A1 | * | 11/2006 | Chilvers | A61M 39/24 137/515 |
| 2007/0295411 A1 | * | 12/2007 | Schwegman | F16K 15/063 137/542 |
| 2008/0190492 A1 | * | 8/2008 | Fuchs | F02M 59/462 137/540 |
| 2009/0183782 A1 | | 7/2009 | Martin | |

* cited by examiner

Related Art

PRESSURE RELIEF VALVE WITH SINGULAR BODY

CROSS REFERENCE TO RELATED APPLICATIONS

This application is a divisional of U.S. application Ser. No. 14/063,760, of Francis J. Martin, filed on Oct. 25, 2013, in the U.S. Patent and Trademark Office, which in turn is a continuation-in-part of U.S. application Ser. No. 12/017,265, of Francis J. Martin, filed on Jan. 21, 2008, in the U.S. Patent and Trademark Office.

BACKGROUND OF THE INVENTION

1. Technical Field

The present disclosure relates to a relief valve and, more specifically, to a pressure relief valve with a singular body.

2. Discussion of the Related Art

A relief valve is a type of valve used to control an amount of fluid pressure in a system. When pressure in the system rises to a predetermined level, the relief valve will open to allow the pressurized fluid to flow from an auxiliary passage out of the system. By releasing the pressurized fluid when the predetermined pressure is reached or exceeded, the system may be protected against excessive pressure. Accordingly, relief valves may be used to ensure that system pressure does not exceed design limits.

A relief valve may include a spring bearing against a poppet. The spring provides a closing force on the poppet to maintain the valve in the closed position. Once the predetermined pressure level is achieved, the poppet is unseated and opens to create a passage through which the pressurized fluid can escape from the system. The unseating of the poppet compresses the spring. When the fluid pressure is sufficiently reduced, the spring pushes the poppet back into the closed position closing off the fluid's passage of escape.

FIG. 1 is a schematic diagram illustrating a conventional relief valve. The relief valve 10 may include a fluid inlet 11 within a body portion 12. Fluid in the inlet 11 presses against a poppet 13, which when in the closed position, may be at least partially within the body 12. The fluid presses against the poppet 13 with a pressure equal to the system pressure. A spring 14 provides a closing force against the poppet 13 such that the poppet 13 will remain in the closed position as long as the system pressure does not exceed the closing force of the spring 14. The spring 14 may push against a stationary shim 18. The poppet 13 is contained within a seat 15 and the seat 15 may allow the fluid to escape through an outlet 16 when the poppet 13 is in the open position. The spring 14 may be within a housing 17. The poppet 13 may at least partially enter the housing 17 when in an open position.

The body 12, the seat 15 and the housing 17 together form a body structure that confines the pressurized fluid. The seat 15 may be welded to both the body 12 and the housing 17 to confine the fluid. The welding may be performed using a brazing process. Alternatively, the seat 15 may be welded to the body 12 by an electron beam welding process and the seat 15 may be welded to the housing 17 by a laser tack welding process.

While modern welding techniques may be quite effective, the possibility still exists that leakage may occur at the welding points. This may be especially true for relief valves operating in high-pressure systems. Moreover, welding can add significantly to the complexity and cost of relief valve manufacture.

SUMMARY

A pressure relief valve includes a singular body that encloses a seat and a stationary shim. A poppet within the singular body is forced into a seated position against a seat by a spring that is attached to the stationary shim. The poppet includes a nose extension that extends into a void enclosed by the seat to provide damping, and a pin inserted into the pressure relief valve body that is configured to expand to lock the pressure relief valve into a housing bore. The seat includes a non-threaded stepped region on its outer surface and the singular body includes a complementary stepped region on its inner surface such that when the seat is fit into the singular body. The stepped region of the seat and the complementary stepped region of the singular body interface with each other to prevent movement of the seat toward the spring.

Sides of the seat beyond the non-threaded stepped region in a direction toward the spring may be in contact with the singular body along a full length of the seat beyond the stepped region.

The shim may hold an end of the spring stationary with respect to the singular body. The stationary shim may be held in place relative to the singular body by a retainer that is also enclosed within the singular body.

The seat may be interference fit into the singular body, the diameter of the seat being larger than an inner diameter of the singular body. The singular body may be temporarily expanded with heat prior to interference fitting the seat into the singular body, such that after the singular body returns to the cooled state, the seat is too large to be dislodged from the singular body.

The pin may include a coating configured to reduce friction and galling.

A pressure relief valve includes a singular body that encloses a seat and a stationary shim, a spring, within the singular body, that is at one end proximate to the shim and at another end proximate to a poppet, and a pin inserted into the pressure relief valve body that is configured to expand to lock the pressure relief valve into a housing bore. The stationary shim is immovably secured within the singular body, and the seat is fit into the singular body for receiving the poppet. The pin includes a coating configured to reduce friction and galling. The seat includes a non-threaded stepped region on its outer surface and the singular body includes a complementary stepped region on its inner surface such that when the seat is fit into the singular body. The stepped region of the seat and the complementary stepped region of the singular body interface with each other to prevent movement of the seat toward the spring.

Sides of the seat beyond the non-threaded stepped region in a direction toward the spring may be in contact with the singular body along a full length of the seat beyond the stepped region.

The stationary shim may be immovably secured within the singular body by a retainer that is also enclosed within the singular body.

The seat may be interference fit into the singular body, the diameter of the seat being larger than an inner diameter of the singular body. The singular body may be temporarily expanded with heat prior to interference fitting the seat into the singular body, such that after the singular body returns to the cooled state, the seat is too large to be dislodged from the singular body.

The poppet may include a nose extension that extends into a void enclosed by the seat to provide damping.

A method for assembling a pressure relief valve includes fitting a seat for receiving a poppet into a singular body, inserting the poppet and a spring into the singular body, and fitting a stationary shim into the singular body for holding an end of the spring stationary with respect to the singular body, wherein the seat is fit into the singular body for receiving the poppet, and fitting a retainer into the singular body to support the stationary shim. The seat includes a non-threaded stepped region on its outer surface and the singular body includes a complementary stepped region on its inner surface such that when the seat is fit into the singular body. The stepped region of the seat and the complementary stepped region of the singular body interface with each other to prevent movement of the seat toward the spring.

Sides of the seat beyond the non-threaded stepped region in a direction toward the spring may be in contact with the singular body along a full length of the seat beyond the stepped region.

The seat may be interference fit into the singular body, the diameter of the seat being larger than an inner diameter of the singular body. The singular body may be temporarily expanded with heat prior to interference fitting the seat into the singular body, such that after the singular body returns to the cooled state, the seat is too large to be dislodged from the singular body.

The stationary shim may be inserted into the singular body after the spring is inserted and the spring is proximate to the stationary shim. The stationary shim may be held in place relative to the singular body by a retainer that is also enclosed within the singular body.

The method may further comprise fitting a circular wire spring into the singular body. The circular wire spring expands into a groove on the inside of the singular body to hold the retainer and shim in place.

The method may further comprise inserting the pressure relief valve into a bore in a housing, and inserting a pin into the singular body proximal to the retainer. The pin may expand to lock the pressure relief valve into the housing bore by an interference fit.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
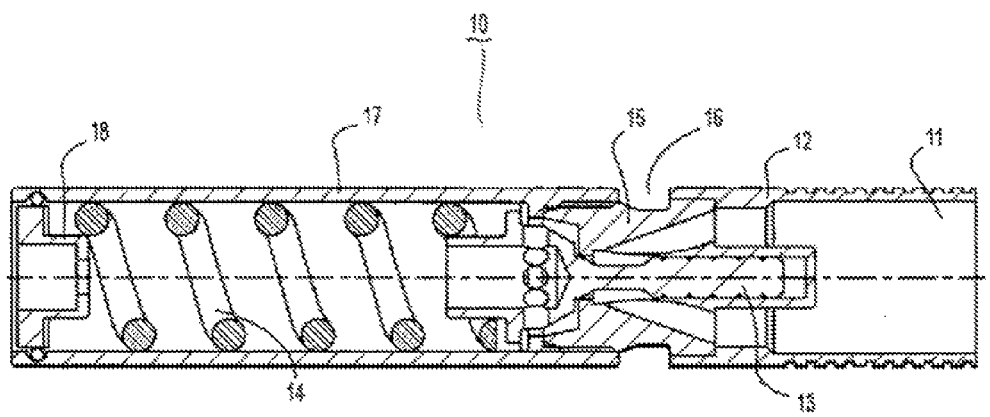
FIG. 1 is a schematic diagram of a conventional pressure relief valve as seen in the related art.

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner. In the drawings, the sizes of some components may be exaggerated for clarity.

Exemplary embodiments of the present invention provide a pressure relief valve having a singular body including an inlet and an outlet, and enclosing a poppet, a seat, and a spring without the need for welding. Accordingly, pressure relief valves according to exemplary embodiments of the present invention may be more resistant to leaks and may be less expensive to manufacture than conventional pressure relief valves.

In conventional pressure relief valves, for example, as shown in FIG. 1, the seat 15 may be positioned between the housing 17 and the body 12. Exemplary embodiments of the present invention may implement a singular body by press fitting the seat into the body, for example, as described in detail below with respect to FIG. 2.

Figure 2:
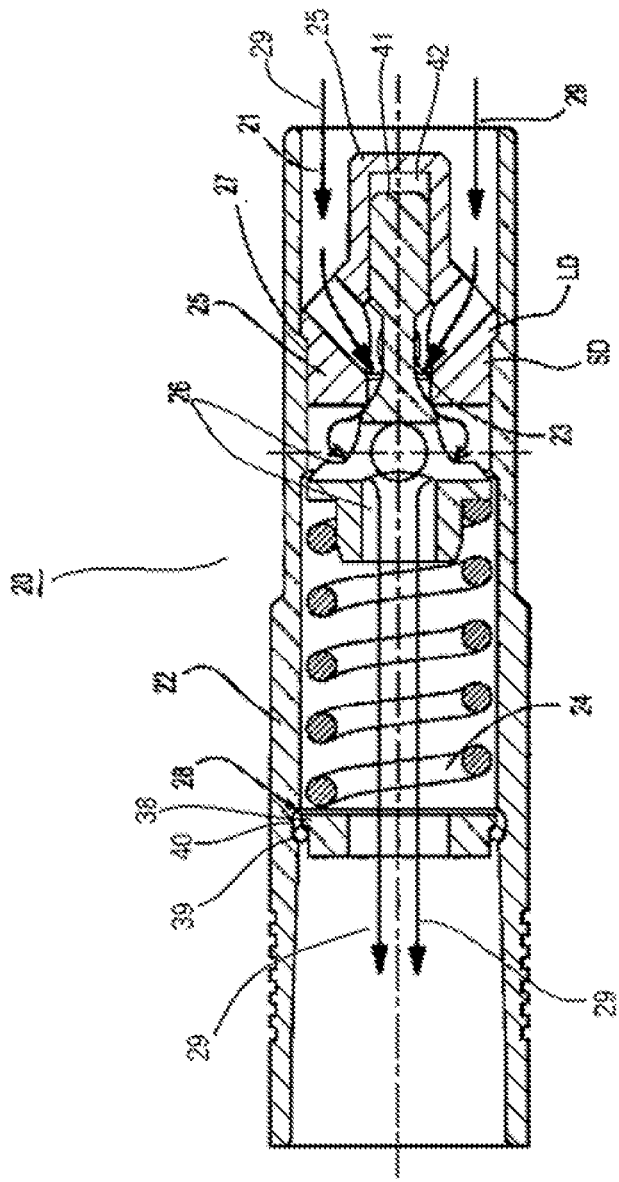
FIG. 2 is a schematic diagram illustrating a pressure relief valve having a singular body according to exemplary embodiments of the present invention.
Figure 2:
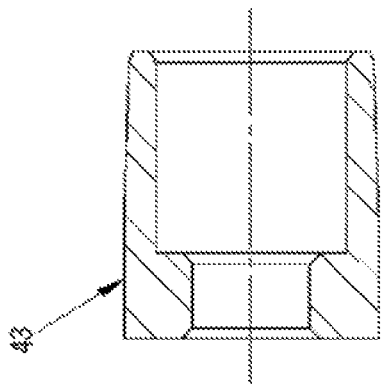

FIG. 2 is a schematic diagram illustrating a pressure relief valve having a singular body according to exemplary embodiments of the present invention. The pressure relief valve 20 may have a singular body 22. A spring 24 may be located within the singular body 22 to provide an axial closing force against a poppet 23. The spring 24 may push against a shim 28 that may also be enclosed within the singular body 22. The shim 28 may fit against other valve components, for example, a retainer 38. A thickness of the shim 38 may be varied to adjust the cracking pressure of the relief valve 20. The retainer 38 may be held in place by a gland 39, which is a circular spring wire configured to expand into groove 40. In alternative embodiments, the retainer may be screwed into the valve body. The shim 28 and the retainer 38 may include openings in a center portion to permit fluid outflow. The poppet 23 may also be enclosed within a seat 25 that is enclosed within the singular body 22. The poppet 23 has a nose extension 41 at a first end that extends into a void enclosed by the seat 25, and a pocket 42 is formed between an end of the nose extension and a closed end of the seat 25. The nose extension 41 of the poppet 23 has a close fit (about a 0.0002-0.0004 inch diametral clearance) to the bore of the seat 25 to provide damping for performance stability, which guides the poppet from closed to open to closed positions. During opening and closing operations, oil gets trapped in the pocket 42, which provide further damping to the poppet 23. In addition, the largest poppet diameter in conjunction with the body bore may be used with the nose extension 41 to guide the poppet 23 in its operating positions. A second end of the poppet 23, opposite from the first end, may be hollow and may connect to outlets 26 drilled into the poppet. When forced into a closed position by the spring 24, the poppet 23 presses against the seat 25 and thus prevents fluid, such as oil, from flowing through the outlets 26. The seat 25 may be interference fit inside the singular body 22, for example, as shown in FIG. 2. With the interference fit, the diameter of the seat 25 is larger than the inner diameter of the body 22 to create a tight fit that prevents leakage.

The valve 20 may further include a pin 43 inserted by force into the valve body 22 proximal to the retainer which expands to lock the valve in place in a housing by an interference fit with the valve body 22. The pin 43 may have a special coating to reduce friction and galling. An exemplary, non-limiting friction reduction coating is polytetrafluoroethylene, marketed under the brand name Teflon by DuPont Co.

Thus, interference fit is a fastening between two parts, here the seat 25 and the singular body 22, which is achieved by friction after the parts have been pushed together. Interference fitting may also be known as press fitting, indicating that pressure is often used as a method for placing the seat within the singular body. In addition to the application of pressure, the diameter of the singular body may be temporarily expanded, for example, with the application of heat, to more easily allow for the insertion of the seat into the singular body.

In addition, the body 22 and the seat 25 include a stepped portion 27 from a larger diameter area LD to a smaller diameter SD. The stepped portion 27 further prevents the seat 25 from moving into the body 22 (in the left-hand direction in FIG. 2) when under pressure from the inlet 21.

Fluid may then enter the pressure relief valve 20 through the inlet 21 and press against the poppet 23, for example, as shown by the fluid path arrows 29.

Accordingly, when the fluid pressure exceeds a desired pressure, i.e., the cracking pressure, the force of the spring 24 is overcome and the poppet 23 is moved away from the seat 25 (unseated) thus allowing the fluid to escape through the outlets 26 and the hollow second end of the poppet 23, for example, as shown by the fluid path arrows 29. When in normal operation, the release of fluid may reduce the fluid pressure until the force of the spring 24 is again able to push the poppet 23 against the seat 25 thereby closing off the flow of fluid through the outlet 26. Accordingly, the pressure relief valve may be used to limit the maximum fluid pressure in the system.

Figure 3:
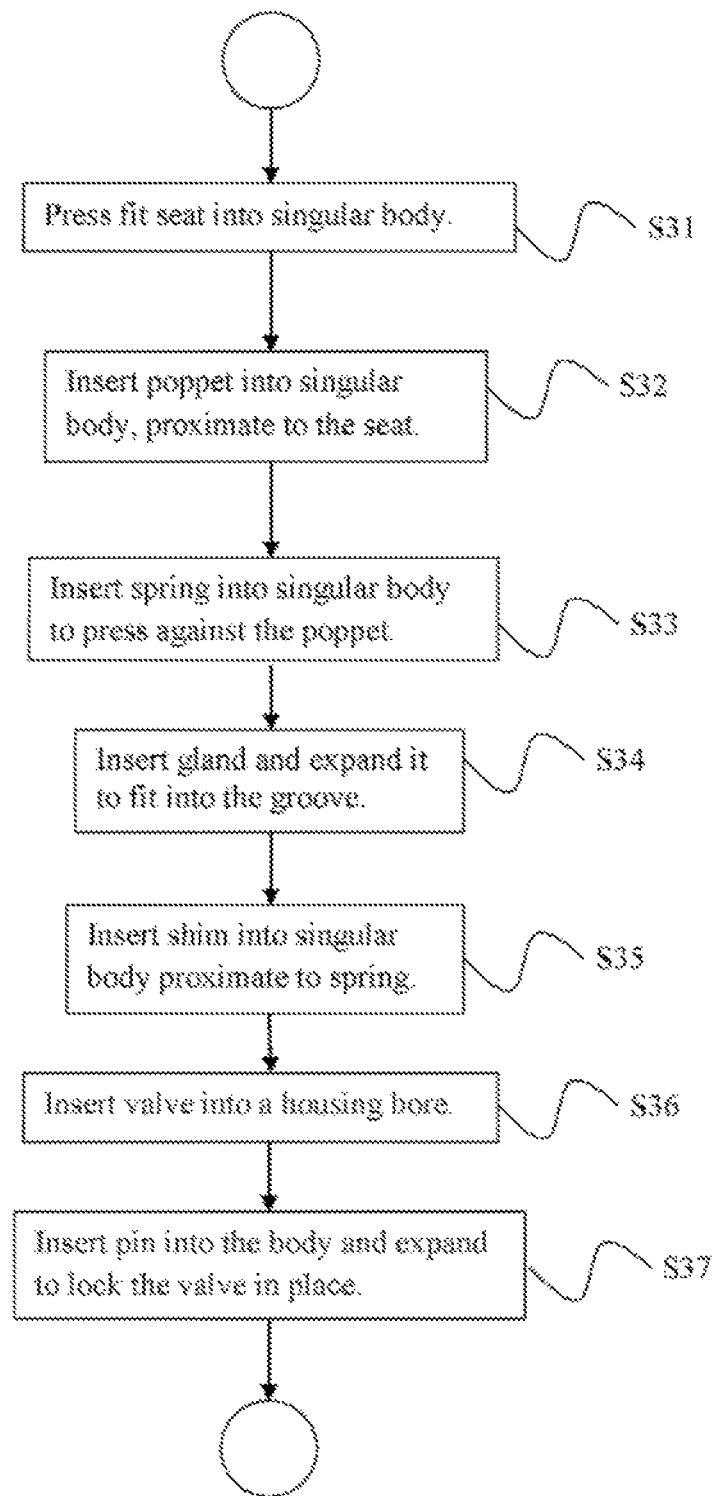
FIG. 3 is a flow chart illustrating a method for assembling a pressure relief valve having a singular body according to exemplary embodiments of the present invention.

Assembly of the single-bodied pressure relief valve may be performed as described with reference to FIG. 3. A seat may then be inserted into the singular body from the first end (Step S31). The seat may be press fit and/or interference fit into the singular body such that it may remain immobile with respect to the singular body. A poppet may then be inserted into the singular body proximate to the seat (Step S32). A spring may be inserted into a singular pressure relief valve body to press against the poppet. (Step S33). The gland is inserted and expanded to fit into the groove to hold a retained in place (Step 34), after which a shim may then be inserted into the singular body proximate to the spring (Step S35). The shim may be inserted along with a retainer. The valve may be inserted into a housing bore (Step S36), and then the pin may be inserted by force into the body (Step S37), expanding to lock the valve in place by interference fit with the housing.

When fit into the singular body, the seat may be pressed such that a stepped region of the seat fits tightly against a complementary stepped region of the inner surface of the body. As such, when fit, potential motion of the seat towards the spring is prevented.

Accordingly, the pressure relief valve may be assembled within a singular body and without the need to perform welding.

Pressure relief valves so assembled may have a reduced fabrication cost, may be more reliable and may have a reduced risk of leakage over conventional pressure relief valves.

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for assembling a pressure relief valve, comprising:
    fitting a seat for receiving a poppet into a singular body;
    inserting the poppet and a spring into the singular body; and
    fitting a stationary shim into the singular body for holding an end of the spring stationary with respect to the singular body, wherein the seat is fit into the singular body for receiving the poppet; and
    fitting a retainer into the singular body to support the stationary shim,
    wherein the seat includes a non-threaded stepped region on its outer surface and the singular body includes a complementary stepped region on its inner surface such that when the seat is fit into the singular body, the stepped region of the seat and the complementary stepped region of the singular body interface with each other to prevent movement of the seat toward the spring;
    wherein the seat is interference fit into the singular body, the diameter of the seat being larger than an inner diameter of the singular body, and wherein the singular body is temporarily expanded with heat prior to interference fitting the seat into the singular body, such that after the singular body returns to the cooled state, the seat is too large to be dislodged from the singular body.

2. The method of claim 1, wherein sides of the seat beyond the non-threaded stepped region in a direction toward the spring are in contact with the singular body along a full length of the seat beyond the stepped region.

3. The method of claim 1, wherein the stationary shim is inserted into the singular body after the spring is inserted and the spring is proximate to the stationary shim.

4. The method of claim 3, wherein the stationary shim is held in place relative to the singular body by the retainer that is also enclosed within the singular body.

5. The method of claim 1, further comprising fitting a circular wire spring into the singular body, said circular wire spring expanding into a groove on the inside of the singular body to hold the retainer and shim in place.

6. The method of claim 1, further comprising:
    inserting the pressure relief valve into a bore in a housing; and
    inserting a pin into the singular body proximal to the retainer, wherein said pin expands to lock the pressure relief valve into the housing bore by an interference fit.

* * * * *